Oct. 19, 1965  E. R. ASTLEY ET AL  3,212,982
FAST FUEL TEST REACTOR
Filed March 9, 1965  3 Sheets-Sheet 3
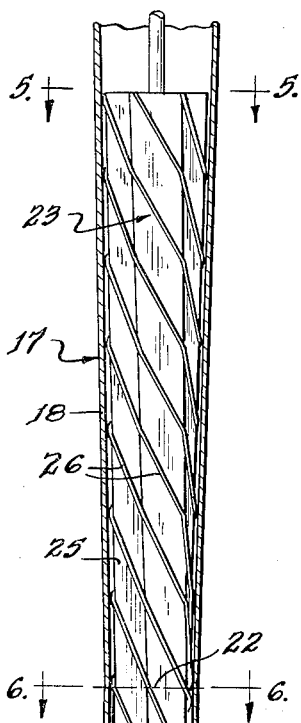
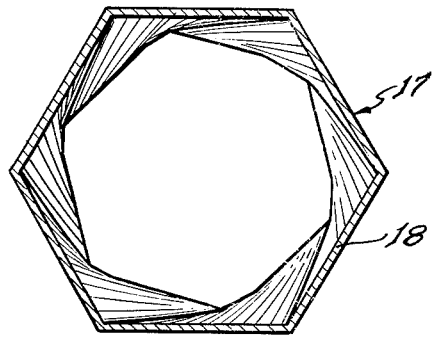
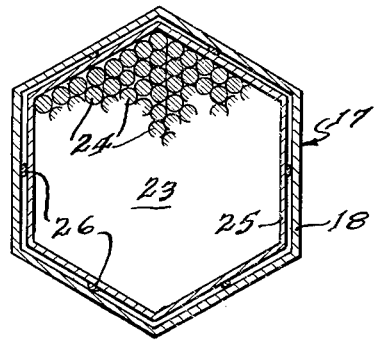
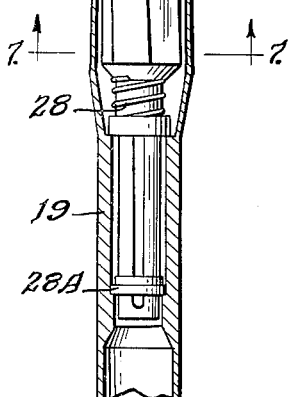
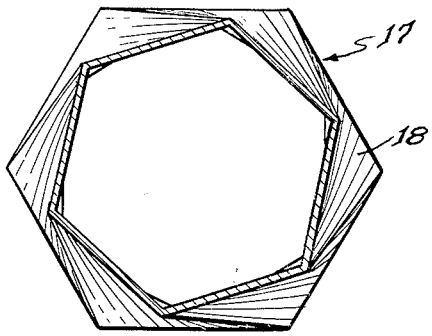
INVENTORS
Eugene R. Astley
Lester M. Finch
Robert T. Hennig
By: Roland G. Anderson
Attorney United States Patent Office 3,212,982
Patented Oct. 19, 1965

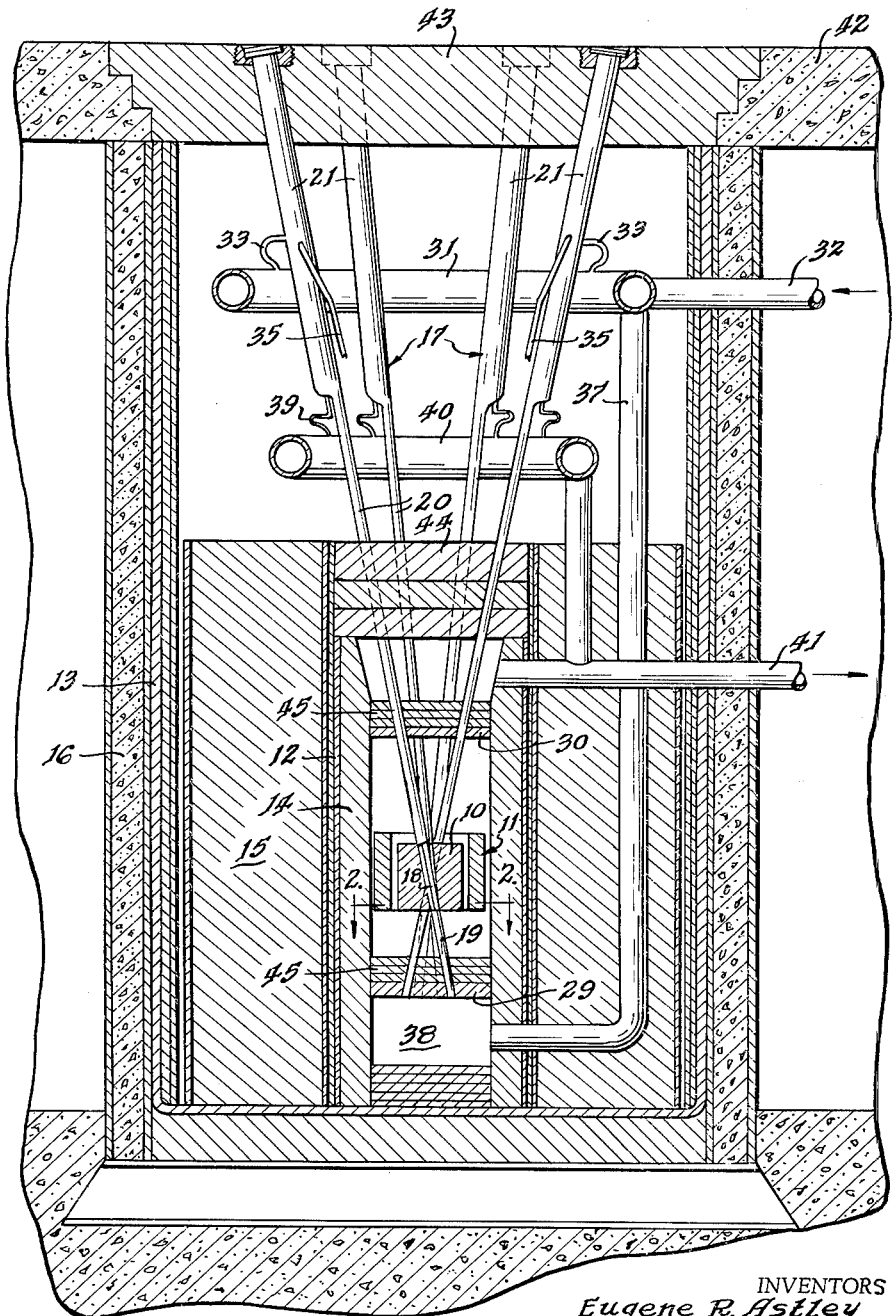

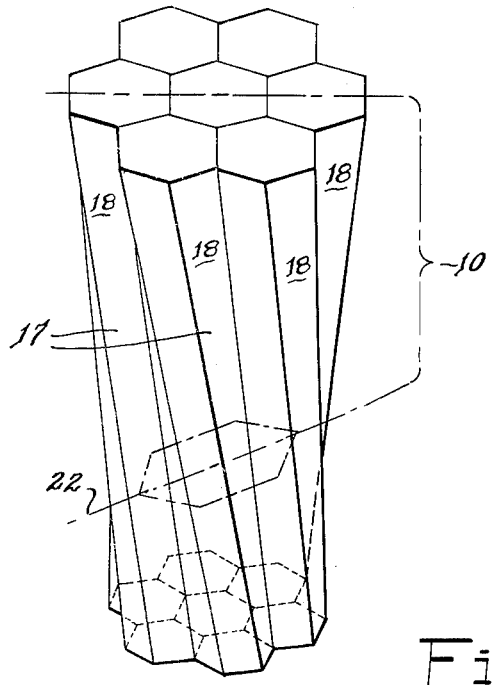
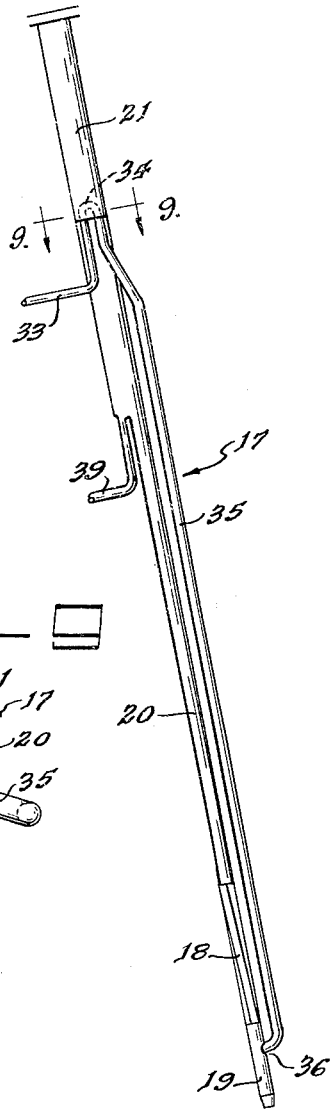
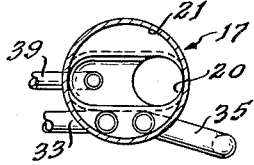
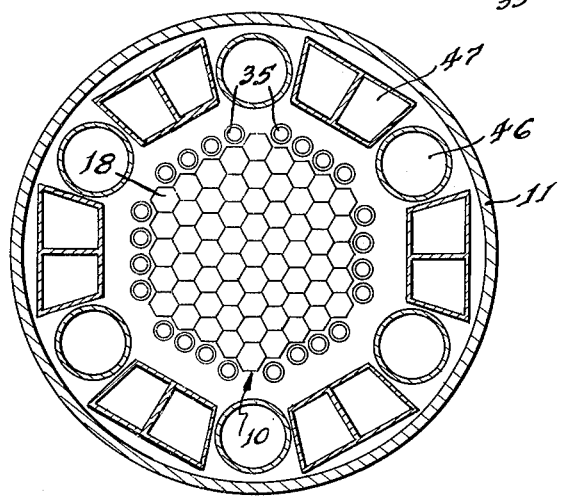

3,212,982
FAST FUEL TEST REACTOR
Eugene R. Astley, Richland, Lester M. Finch, Pasco, and Robert J. Hennig, Richland, Wash., assignors to the United States of America as represented by the United States Atomic Energy Commission
Filed Mar. 9, 1965, Ser. No. 438,437
2 Claims. (Cl. 176—40)

This invention relates to a nuclear reactor. In more detail the invention relates to a Fast Fuel Test Reactor—a reactor which is useful for developing and testing fuel elements for fast nuclear reactors.

Development of fast reactors—particularly those in which breeding is attained—to the stage where power plants incorporating a fast reactor as heat source are economically competitive with conventional fossil-fueled power plants appears to be essential if full advantage is to be taken of our nuclear fuel resources.

Since the most important element in a nuclear reactor is the fuel element, the development of fuel materials and fuel elements of optimum characteristics for a fast reactor is of the utmost importance. As is shown by the developmental effort required to make economically competitive nuclear power from thermal reactors a reality, an extensive development and testing program is required for this purpose.

Surveys of fast fuel test requirements indicate that full utilization of existing facilities would not satisfy more than a small fraction of total testing needs. In the first place it is not possible to obtain meaningful information about the behavior of a fuel material or fuel element in a fast neutron flux by subjecting it to a thermal neutron flux. While meaningful information can be obtained from fast fuel test loops in thermal reactors which are designed to have a significant fast flux in the loop, such loops provide only a limited amount of test space, have a minimum acceptable fast neutron flux and are expensive in terms of test space obtained. Meaningful information can also be obtained from existing fast reactors but such reactors do not have the versatility to meet primary test needs. In particular, extensive requirements for fast fuel testing in closed loops are not met in any existing facility.

A specialized fast fuel testing facility should:

(1) Provide up to 16 instrumented open and closed testing loops.

(2) Provide easy access to each process tube and ample room for monitoring instruments.

(3) Provide a hard spectrum neutron flux of $10^{16}$ neutrons/cm.$^2$-sec. with 75% above 0.1 m.e.v.

It is an object of the present invention to develop a nuclear reactor having the above-described characteristics and including a compact core with ample space for fuel handling and for monitoring instruments.

In still more detail it is an object of the present invention to develop a nuclear reactor incorporating a minimum-void core for safety and yet providing ample room for fuel handling and for monitoring instruments.

These and other objects of the present invention are attained in a sodium-cooled, reflector-controlled fast reactor incorporating a plurality of closely packed process tubes arranged in what may be described as a skewed-conical relationship so that at certain regions the process tubes are close together and at other regions they are widely spaced. To provide a minimum-void core, in the core region the process tubes are hexagonal in cross section, arranged in a skewed-conical relationship, tapered from the top of the core region to the bottom, and each individual tube is twisted with respect to the vertical. By these expedients the core region is occupied nearly completely by the process tubes with minimum space between process tubes.

The invention will next be described with reference to the accompanying drawings wherein:

FIG. 1 is a vertical section of the nuclear reactor of the present invention,

FIG. 2 is a horizontal section taken on the line 2—2 in FIG. 1,

FIG. 3 is a schematic perspective view of a portion of the reactor showing the central process tube and one row of six tubes arranged around the central tube, FIG. 4 is a vertical section of a portion of a process tube showing a fuel assembly therein, FIG. 5 is an enlarged horizontal section taken on the line 5—5 of FIG. 4, the fuel assembly being removed for clarity, FIG. 6 is an enlarged horizontal section taken on the line 6—6 of FIG. 4, FIG. 7 is an enlarged horizontal section taken on the line 7—7 of FIG. 4, the fuel assembly being removed for clarity, FIG. 8 is an elevation of a reentrant process tube, and FIG. 9 is a horizontal section taken on the line 9—9 of FIG. 8.

As shown in FIG. 1, the reactor of the present invention comprises a core 10, a reflector 11 surrounding the core, an inner shell 12 surrounding the reflector and a reactor vessel 13 surrounding the inner shell, there being also a containment vessel (not shown) surrounding the entire reactor. Thermal shielding 14 is provided between the reflector 11 and the inner shell 12, neutron shielding 15 between the inner shell 12 and the reactor vessel 13, and blast shielding 16 just outside of the reactor vessel 13.

Sixty-one process tubes 17 including an hexagonal central portion 18, a lower cylindrical extension 19, and an upper cylindrical extension 20 having an enlarged portion 21 form the flow channels for coolant. As shown particularly in FIG. 3, the central tube is vertical and the remaining tubes 17 are grouped around the central tube and are angled somewhat to the vertical. At the lower end of the core 10, but above the bottom of the hexagonal portions 18 of process tubes 17, is a horizontal plane 22 which is here defined as the skew intercept plane, because it is there that the tubes 17 attain their most compact arrangement within the core.

Sixty tubes 17 are arranged around the center tube 17 in four circular rows with six tubes in the first row, 12 tubes in the second row, 18 tubes in the third row and 24 tubes in the fourth. A projection of the longitudinal axes of each of these tubes on the skew plane 22 is tangent to a circle having the longitudinal axis of the central tube as its center. The axis of the skewed tubes as shown is 2.7° to the vertical.

As shown in FIG. 3, hexagonal portions 18 of process tubes 17 mate geometrically one with the other to form a substantially voidless core by virtue of their hexagonal shape, their skewed arrangement in space, a slight twist (about 2.7°) about their longitudinal axis, and a slight taper. The process tubes measure 4.25 inches across flats at the skew plane and 4.58 inches across flats at the top of the core. The core is approximately a right circular cylinder 36 inches high by 37 inches in diameter.

Referring next to FIGS. 4 to 6, fuel assemblies 23 are twisted, tapered, hexagonal prisms occupying hexagonal portions 18 of process tubes 17. The upper and major part of each fuel assembly 23 contains 217 solid cylindrical fuel rods 24 uniformly spaced and supported on an equilateral triangular pitch and these fuel rods taken together form the reactor core 10. Fuel rods 24 are composed of 0.194-inch diameter plutonium-dioxide stainless-steel cermet fuel metallurgically bonded to 0.008-inch thick stainless-steel cladding. The active fuel length is 36 inches and the over-all length of the fuel rods is 38½ inches. A 0.050-inch thick stainless-steel liner 25 fits snugly around the assembly while 12 spiral spacer strips 26 are wrapped around liner 25. The purpose of the liner 25 is to flatten the transverse temperature gradient in the process tubes to reduce thermal bowing by rotating the annular coolant stream.

Fuel assemblies 23 are introduced into process tubes 17 by rotating them slightly, thereby effectively "screwing" them in. The fuel assemblies are positioned in central portions 18 of process tubes 17 by the 12 spiral spacer strips 26 which are disposed on the outside of each of the faces of the stainless-steel liner 25. Strips 26 are interrupted at the edge of a face of the liner and start again on the next adjacent face.

Fuel assemblies 23 are retained in the process tube by a spring-latch assembly including springs 28 and bayonet latches 28A.

Process tubes 17 are supported at the bottom by a tube sheet 29 and are guided at the top by a tube sheet 30. Process tubes 17 are 40 feet long and are of two types, the outer ring of 24 tubes being reentrant tubes and the remainder of the tubes being once-through tubes. Coolant enters the once-through tubes from the bottom; it enters the reentrant tubes at the top, passes across the tube, and then passes down alongside the process tube to reenter the tube at the bottom.

To obtain this coolant flow inlet ring header 31 accepts coolant from an inlet line 32 and distributes coolant to a plurality of inlet connector lines 33 from which coolant enters each of the outer ring of process tubes near the top thereof, crosses through the tube in pipe 34 (see FIG. 8), passes down alongside the process tube via pipe 35, and reenters the process tube at inlet 36 near the bottom of the process tube. In addition ring header 31 feeds coolant to a pipe 37 leading to an inlet plenum 38 which distributes coolant to the inner process tubes. Coolant from all of the process tubes departs the process tube via outlet connectors 39 to outlet ring header 40 and ultimately to outlet line 41. Coolant passing up through reflector 11 and around core 10 forms a pool above the core and also leaves the core via outlet line 41. Sodium is employed as coolant as is conventional in fast reactor operation.

Other features disclosed in the drawing include an upper biological shield 42 which extends across the entire containment vessel and includes a shielding plug 43. Also a neutron shield 44 is disposed at the top of inner shell 12 and thermal shielding 45 is disposed above and below the reactor core.

Reflector 11 includes movable components for safety and operational control in a high-nickel-content annulus immediately adjacent the outer process tubes. Operational control elements consist of six rotatable drums 46 (see FIG. 2) located at the corners of the hexagonal process tubes 17. Each drum is divided into a poison ($B_4C$) and a reflector (Inconel) half section whereby control is obtained by rotating the poison section inward or outward of the core-reflector interface. Six safety control elements 47 are disposed between control drums 46 alongside the core 17, and each consists of a reciprocable body containing an Inconel reflector portion at the bottom thereof and a $B_4C$ poison section near the top thereof. The poison portion drops into position alongside the reactor core when a scram occurs and may be adjusted to compensate for long-range operational changes in reactivity.

It will be noted that a skewed array of process tubes provides a high degree of accessibility to the core for loading and unloading for both open and closed loop facilities and that the process tubes can be fully instrumented for coolant flow, pressure and temperature as well as for sensors applied directly to the fuel assemblies being irradiated.

By virtue of this skewed arrangement a close packed tube array in the core zone and an open, well separated tube array away from the core is attained. A minimum-void core having a high degree of dimensional stability is obtained by employing a skewed, twisted hexagonal process tube which tapers from bottom to top. The elimination of core voids is particularly desirable for fast reactors because of their inherent sensitivity to core dimensional instability and because typical high-power densities require efficient utilization of core volume for coolant, fuel and structure. Because each individual process tube can be monitored for all individual process and performance variables, the entire reactor can be operated at higher performance levels that would be possible only with bulk measurement of coolant conditions. In addition, because of the individual process tube monitoring, safe reactor operation can be obtained during deliberate or inadvertent atypical operation such as irradiation of defected fuel elements.

The following table gives the more important reactor parameters.

It is apparent that some of the advantages of the present invention can be attained by employing straight hexagonal, tapered process tubes rather than twisted tubes. However, the proportion of voids in the core will be higher than in a core constructed in accordance with the present invention.

*Summary of fast fuel test reactor characteristics*

Basic Core (driver fueled).
Power _____ 400 m.w.t.
Coolant:
    Fluid _____ Sodium.
    Inlet temperature _____ 450° F.
    Outlet temperature _____ 750° F. (startup)—
                                  1100° F. (max.).
    Net velocity _____ 25 ft./sec. (startup).
Fuel:
    Fuel rod material _____ $PuO_2$-SST Cermet.
    $PuO_2$ in cermet _____ 12 to 17 v./o.
    Clad material _____ Stainless steel.
    Fuel diameter _____ 0.194 in.
    Clad thickness _____ 0.008 in.
    Clad diameter _____ 0.210 in.
    Rods per tube _____ 217.
Core:
    Length _____ 36 in.
    Equivalent diameter _____ 37 in.
    Volume _____ 600 liters.
    Number of tubes _____ 61.
    Tube shape _____ Tapered hexagonal.
    Dimension across flats:
        (Core top) _____ 4.58 in.
        (Core bottom) _____ 4.25 in.
    Material _____ Stainless steel.
    Wall thickness _____ 0.10 in.
    Average neutron flux _____ $\sim 10^{16}$ n./cm.$^2$-sec.

It will be understood that the invention is not to be limited to the details given herein but that it may be modified within the scope of the appended claims.

What is claimed is:

1. A fast neutron reactor including a central vertical process tube and a plurality of process tubes arranged in concentric hexagons around the central tube in a skewed-conical relationship, said process tubes including a twisted hexagonal tapered portion containing a fuel assembly, which portions geometrically mate one with another to define a core of minimum voids.

2. A fast nuclear reactor including a central vertical process tube, 60 process tubes disposed in triangular array around the central tube in a skewed-conical arrangement, the process tubes being close together at the bottom of the core, a projection of the longitudinal axis of each process tube on the skew plane being tangent to a circle having the longitudinal axis of the central tube as its center, each of said process tubes including a twisted hexagonal tapered portion containing a fuel assembly, wherein said hexagonal tapered portions geometrically mate to define a core of minimum voids.

References Cited by the Applicant

2,975,117  3/61  Zinn.

OTHER REFERENCES

Atomics, March–April, 1964, page 18.

REUBEN EPSTEIN, *Primary Examiner.*